Figure 1:
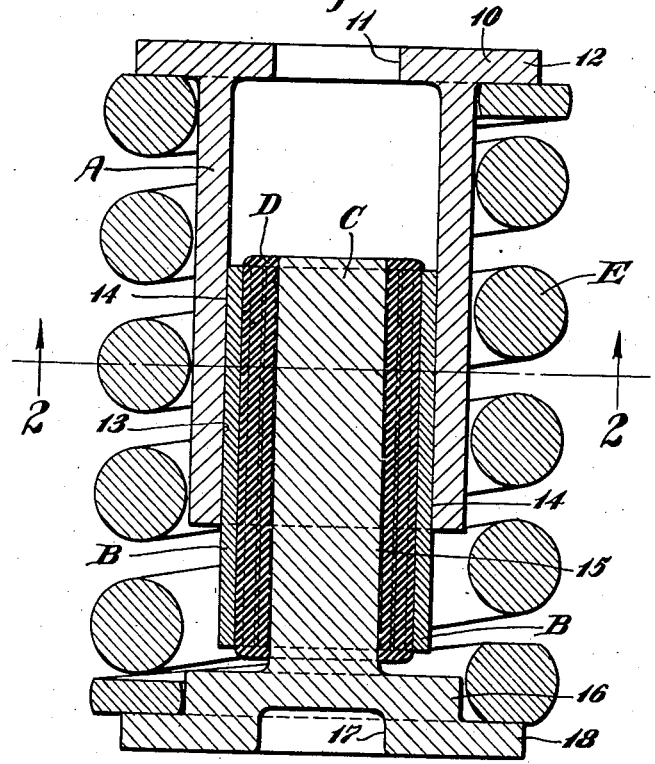

Inventor
Roland J. Olander
By Henry Fuchs
Atty.

Dec. 9, 1941.  R. J. OLANDER  2,265,392
SHOCK ABSORBER
Filed Feb. 9, 1940  2 Sheets-Sheet 2
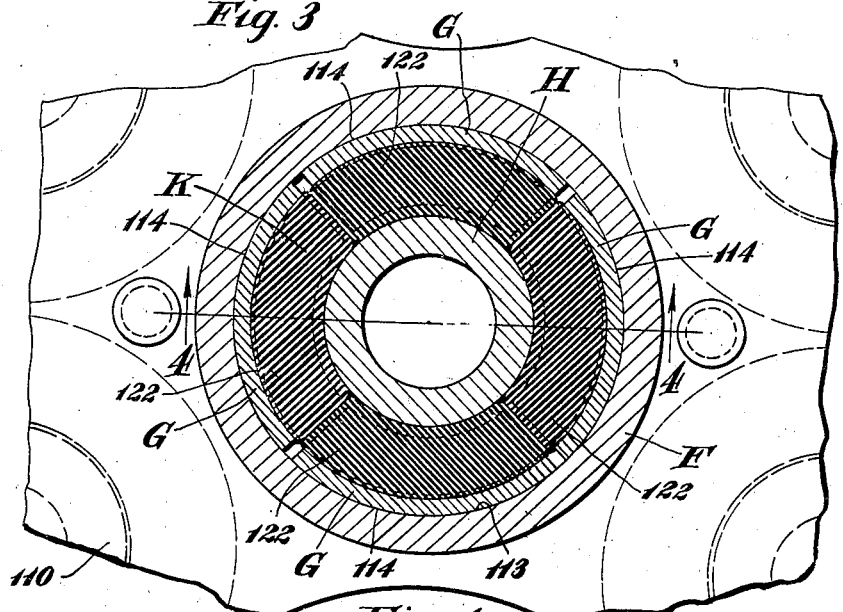
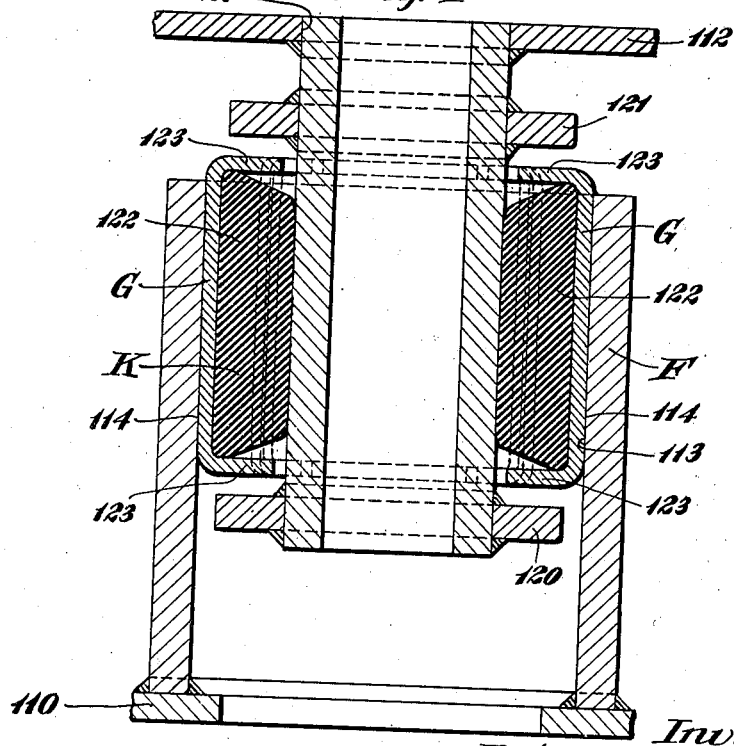
Inventor
Roland J. Olander
By Henry Fuchs
Atty.

Patented Dec. 9, 1941

2,265,392

UNITED STATES PATENT OFFICE 2,265,392

SHOCK ABSORBER

Roland J. Olander, Chicago, Ill., assignor to W. H. Miner, Inc., Chicago, Ill., a corporation of Delaware Application February 9, 1940, Serial No. 318,032

11 Claims. (Cl. 267—9)

This invention relates to improvements in shock absorbers, especially adapted for use as snubbing devices in connection with truck springs of railway cars.

One object of my invention is to provide a shock absorber functioning as a snubbing device for truck springs of railway cars, comprising relatively movable friction elements and a rubber member under compression adapted to force the friction elements into intimate contact with each other, wherein the rubber member yields to permit oscillations of slight amplitude of the truck springs and delayed action of the friction means to snub oscillations of greater amplitude of said springs regardless of variations in the dead load carried by the truck springs.

A further object of the invention is to provide a shock absorber of simple design, especially adapted for use as a snubber of railway cars and replacing at least one of the coil springs of the usual set of springs employed in each cluster of such car trucks, wherein the snubbing action is obtained by frictional resistance between relatively sliding members pressed against each other by a rubber element under compression.

Another object of the invention is to provide a shock absorber of the character indicated in the preceding paragraph, including relatively movable friction elements, and rubber cushioning means pressing the friction elements together, wherein initial action is had during slight oscillations of the truck springs by stretching of the rubber element without actuation of the friction elements, and wherein during oscillations of greater amplitude the friction elements become operative to produce substantial snubbing action of said springs.

A further object of the invention is to provide a mechanism as set forth wherein the transition from very slight resistance, due to stretching of the rubber member, to substantial snubbing resistance produced by relative movement of the friction elements, is effected by the static friction between the friction elements being overcome by the resistance to further stretching of the rubber member.

Still another object of the invention is to provide in a shock absorber comprising a rubber cushioning member and relatively movable friction element held in frictional contact by the rubber member, means for positively effecting relative movement of the friction elements to provide for snubbing when said rubber member has been stretched to a predetermined extent.

Another object of the invention is to provide a shock absorber especially adapted as a snubbing device in connection with truck springs of railway cars, comprising relatively movable friction elements and a rubber member yieldingly holding said elements in frictional contact, wherein the friction elements are fixed respectively to the spring follower plates of the truck springs and are movable respectively in unison with said spring plates in compression and recoil of the truck springs.

Other objects of the invention will more clearly appear from the description and claims hereinafter following.

Figure 2:
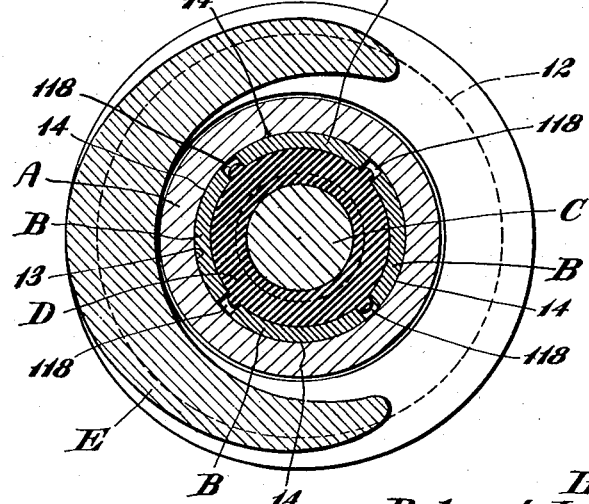

In the drawings forming a part of this specification, Figure 1 is a vertical sectional view of the improved shock absorbing snubber. Figure 2 is a horizontal sectional view corresponding substantially to the line 2—2 of Figure 1. Figure 3 is a horizontal sectional view, similar to Figure 2, showing another embodiment of the invention, said view illustrating in dotted lines portions of springs of a five unit cluster of truck springs. Figure 4 is a vertical sectional view, corresponding substantially to the line 4—4 of Figure 3, certain parts being broken away.

Referring first to the embodiment of the invention illustrated in Figures 1 and 2, my improved shock absorber or snubber comprises broadly a casing A; four friction shoes B—B—B—B telescoped within the casing; a post C; a rubber element D interposed between the post and shoes; and a spring E surrounding the casing and yieldingly opposing relative movement of said casing and the post which carries the rubber element and shoes.

The friction casing A is in the form of a substantially cylindrical tubular member open at the inner or bottom end and closed by a transverse end wall 10 at the outer or upper end, said wall being provided with a central opening 11 adapted to accommodate the usual spring centering projection of the top spring follower plate for the truck springs. The wall 10 projects laterally outwardly beyond the main body portion of the casing, providing an annular flange 12 which forms an abutment for the upper end of the spring E. The curved interior face of the casing wall provides a friction surface 13 with which the shoes B cooperate.

The shoes B, which are preferably four in number, are in the form of transversely curved plates presenting exterior friction surfaces 14—14—14—14 cooperating with the interior friction surface 13 of the casing.

The post C comprises a cylindrical column 15 having a substantially circular, concentric base 16 integral therewith. The base 16 is provided with a downwardly opening central recess 17 and is reduced in thickness at its periphery to provide an annular flange 18 which forms a seat for the bottom end of the spring E. The recess or opening 17 is adapted to accommodate the usual spring centering projection on the spring follower plate which cooperates with the truck springs.

The rubber element D is in the form of a cylindrical tube and is interposed between the column member 15 of the post C and the shoes B—B—B—B. The rubber tube D is fixed to the post and shoes by having its inner and outer surfaces sealed respectively to said post and shoes by cementing or any other binding process. As shown clearly in Figure 1, the tubular rubber element D is of greater length than the shoes B—B—B—B and projects beyond the top and bottom ends of the latter. The upper end of the tubular element D is preferably flush with the top end of the post C and has its lower end spaced from the top side of the base 16 of said post to provide clearance for longitudinal stretching of said element, as hereinafter pointed out.

As shown in Figure 2, the shoes B—B—B—B are slightly spaced circumferentially with respect to each other, thereby providing openings 118—118 therebetween to accommodate flow of the material of the compressed rubber tube D.

The spring E, which is in the form of a coil surrounding the casing A has its top and bottom ends bearing respectively on the flange 12 of the casing and the flange 18 of the base of the post C.

In the assembled condition shown in Figure 1, the rubber element D is under initial compression and by its tendency to expand maintains the friction shoes B—B—B—B in tight frictional contact with the interior friction surface of the casing A.

As will be understood by those versed in this art, the snubbing device shown in Figures 1 and 2 is substituted for one of the spring coils or set of coils of a cluster of truck springs of a railway car and cooperates with the top and bottom spring follower plates of said spring cluster. The snubbing device is thus compressed between the body and truck bolsters of the car together with the other springs of said cluster. Although it is preferable to substitute the snubber for one coil of a set of coils of the cluster of springs, the use thereof is not limited thereto and such snubbers may be substituted for more than one spring or set of springs, as found expedient and desirable.

In the operation of my improved snubber shown in Figures 1 and 2, assuming the parts to be in the position shown in Figure 1, upon the spring cluster of the truck of a railway car being compressed, the casing A and the post C will be forced toward each other, the post C moving into the casing A, opposed by the spring E. During the initial inward movement of the post with respect to the casing, the rubber tube D will be stretched, the shoes at this time being held stationary due to the static friction between the shoes and the casing A. This action continues until the resistance offered to stretching of the rubber tube becomes greater than the static friction between the shoes and the casing, whereupon the shoes will be forced to slide inwardly of the casing in unison with the post C. Due to the friction existing between the friction surface of the casing and the shoes which are pressed against the casing by the inherent resiliency of the rubber tube which is under initial compression, relative movement of the parts is frictionally opposed. Oscillations of slight amplitude of the springs are thus taken care of by the yielding action of the rubber tube alone in being stretched and oscillations of greater amplitude are effectively taken care of by the relatively highly frictional resistance afforded by the relative movement of the shoes and casing. Oscillations of substantial amplitude of the truck springs are thus effectively snubbed, thereby reducing the number of oscillations of said springs to a minimum without interference with the proper cushioning action of the truck springs during slight compression or oscillations of slight amplitude of the latter.

Upon expansion of the coils of the truck spring cluster, the spring follower plates are moved apart and the post C and the casing A will be moved away from each other by the expansive action of the spring E which reacts against the flange 12 of the casing A and the flange 18 of the post C, thereby returning the parts to approximately the normal position shown in Figure 1.

In this connection it is pointed out that under different loads imposed upon the truck springs, the device shown in Figure 1 will be initially compressed by the dead load to different degrees, depending upon whether or not the car is loaded to full capacity, or loaded to part capacity only, or is entirely empty, whereby the normal position of the parts of the snubber will vary with the dead load conditions, that is, the friction plates or shoes B—B—B—B will be telescoped within the casing to various extents greater than the telescoped condition shown in Figure 1. For each varying condition of dead load the action of the snubber will be the same as that hereinbefore described, the rubber member permitting substantially free slight oscillations of the truck springs for each condition of dead load without actuation of the friction elements, the action of the latter being reserved for snubbing the greater oscillations of the truck springs. It is thus evident that the device is substantially automatic in adjustment to different load conditions of the railway car.

Referring next to the embodiment of the invention illustrated in Figures 3 and 4, the structure is broadly the same as that hereinbefore described, with the exception that the friction casing and the post are directly attached to the spring follower plates of the truck springs, instead of being separate therefrom, that the spring surrounding the casing is omitted, that the friction plates or shoes are slightly of different design, and that positive means is employed for effecting action of the friction shoes after the rubber member has been stretched to a predetermined extent.

The shock absorber shown in Figures 3 and 4 comprises broadly a casing F; four friction shoes G—G—G—G; a post H; and a sectional tubular rubber element K composed of four parts.

The casing F is in the form of a cylindrical tube open at both ends and welded at its bottom end to the bottom spring follower plate 110. The curved interior face of the casing wall provides a friction surface 113 similar to the surface 13 of the casing A hereinbefore described.

The shoes G, which are preferably four in number, are in the form of transversely curved plates presenting exterior friction surfaces 114—114—114—114 which contact with the interior friction surface 113 of the casing F. Each shoe is provided with inturned flanges 123—123 at the top and bottom ends thereof.

The post H is in the form of a cylindrical tube open at both ends and has its upper end seated in an opening 111 provided in the top spring follower plate of the truck spring cluster, which plate is indicated by 112. The post H is securely fixed to the follower plate 112 in any suitable manner, preferably being welded thereto. The tubular post H is concentric with the casing F and projects within the latter as shown most clearly in Figure 4. At its bottom end and closely adjacent its upper end, the post H is provided with rings 120 and 121 which are secured thereto by welding. These rings form, in effect, projecting annular flanges on the post which cooperate with the friction shoes as hereinafter pointed out, to actuate the latter after a predetermined stretching of the rubber element K has been effected. The ring 121 is spaced an appreciable distance from the top spring follower plate 112 as most clearly shown in Figure 4.

The rubber element K is composed of four transversely curved sections 122—122—122—122, which are interposed between the post H and the shoes G—G—G—G, the same being arranged in annular series and forming, in effect, a cylindrical tube. Each rubber section 122 is embraced between the top and bottom flanges 123—123 of the cooperating shoe and is thus held against longitudinal bodily movement with respect to said shoe. It may further be sealed to said shoe by its outer surface being fixed thereto by cementing or any other binding process. Each section 122 is preferably fixed to the post H by having its inner side sealed to said post by cementing or any other binding process. The top and bottom ends of each rubber section 122 are cut away, as shown, to provide clearance for flow of the material of said pad as the same is stretched lengthwise through relative movement of the post H and the shoes G—G—G—G. This rubber element K is under initial compression and operates in substantially the same manner as the rubber element D hereinbefore described, to permit oscillations of slight amplitude of the truck springs without operation of the friction shoes, thus reserving the friction action of the shoes for oscillations of greater emplitude.

The operation of the shock absorber shown in Figures 3 and 4 is substantially the same as that of the device shown in Figures 1 and 2, with the exception that the shoes are positively moved by the ringlike stop flanges 120 and 121 on the post, which engage the flanged ends of the shoes after the rubber element K has been stretched to a predetermined extent.

It is pointed out that inasmuch as the friction casing F and the post H are fixed respectively to the top and bottom spring follower plates for the truck spring cluster, the parts of the shock absorber will be returned to normal position by the expansive action of the truck springs separating the spring follower plates.

The snubber shown in Figures 3 and 4 is illustrated in Figure 3 as substituted for the central element of a cluster of five springs, but as will be evident more than one snubber may be employed, if found expedient, the same being substituted for the corresponding number of springs eliminated.

I have herein shown and described what I now consider the preferred manner of carrying out my invention, but the same is merely illustrative and I contemplate all changes and modifications that come within the scope of the claims appended hereto.

I claim:

1. In a shock absorber, the combination with a friction casing; of a column member extending into said casing, said casing and member being movable toward and away from each other; spring means opposing relative movement of said casing and member; friction shoes having sliding frictional engagement with said casing; and a tubular rubber element under compression surrounding said column member and interposed between said shoes and member, holding said shoes in frictional contact with the casing, said element being fixed to said shoes and member respectively against bodily movement with respect to the same and yieldingly opposing relative movement in a lengthwise direction of said shoes and member to a predetermined extent by stretching of said rubber element until the static friction between said shoes and casing is overcome to oppose light shocks, said shoes being movable with said column member after said predetermined relative movement to slide in said casing and produce relatively high frictional resistance.

2. In a shock absorber, the combination with a tubular casing; of a post extending into said casing, said post and casing being relatively movable in lengthwise direction; means yieldingly opposing said relative movement of the post and casing; a rubber element surrounding said post and being in hermetically sealed fixed surface contact therewith; a series of shoes surrounding said rubber element; and means for securing said rubber element to the shoes against bodily movement with respect to said shoes, said shoes having sliding frictional engagement with the interior surface of said casing, said rubber element being held compressed between said shoes and post and due to its compressed condition holding said shoes in frictional contact with the casing and being stretchable lengthwise to a limited extent by relative movement of said shoes and post in lengthwise direction until the static friction between said shoes and casing is overcome, whereupon said shoes slide in the casing with said post to provide high frictional resistance.

3. In a shock absorber, the combination with a tubular casing; of a post extending into said casing; spring means yieldingly resisting relative longitudinal movement of said casing and post; friction shoes surrounding said post and in frictional contact with the interior of said casing; and a lengthwise stretchable rubber element interposed between said post and shoes, said rubber element being in hermetically sealed fixed face to face engagement with said shoes and post, and under lateral compression to hold said shoes in frictional contact with the casing, said rubber element being stretchable lengthwise by relative movement of said post and casing while said shoes are held against movement by the static friction between the same and the casing, said shoes being forced to move in unison with the post upon the static friction between the casing and shoes being overcome by the resistance to stretching of the rubber element, to slide said shoes with respect to said casing.

4. In a shock absorber, the combination with a tubular casing; of a post extending into said casing; yielding means resisting relative longitudinal movement of said post and casing toward each other; a tubular rubber member surrounding said post and sealed thereto; and a circular series of shoes within the tubular casing surrounding said rubber member and sealed thereto, said rubber member being under compression between said shoes and post.

5. In a shock absorber, the combination with a casing; of a post extending into said casing, said post and casing being relatively movable in lengthwise direction; a plurality of shoes between said post and casing in frictional contact with the interior of said casing; a rubber member yieldingly connecting said shoes to the post for longitudinal movement therewith, said member being under initial lateral compression between said shoes and post and immovably anchored at the inner side to said post and at the outer side to said shoes, the body of said rubber member between said sides being free to stretch lengthwise to permit a limited relative movement between said post and shoes lengthwise of the mechanism; and means yieldingly resisting relative approach of said post and casing in lengthwise direction.

6. In a shock absorber, the combination with a hollow cylindrical casing open at one end and having an annular abutment flange at the other end; of a cylindrical post having a base plate integral with one end thereof, the other end of said post extending into the open end of the casing; a spring surrounding said casing and interposed between said base plate of the post and said flange of the casing; an annular series of friction shoes surrounding said post, said shoes having sliding frictional contact with the interior wall of said casing; and a tubular rubber element surrounding said post and interposed between said post and shoes, said rubber element being interiorly sealed to said post and exteriorly sealed to said shoes.

7. In a shock absorber for truck springs of railway cars including a nest of springs and top and bottom spring follower plates cooperating with said nest of springs, the combination with a tubular casing fixed to one of said spring follower plates; of a post fixed to the other spring follower plate and extending into said casing; a compressed rubber element surrounding said post and in fixed surface contact therewith; and friction shoes interposed between the rubber element and casing, said shoes being in fixed surface contact with said rubber element and having sliding frictional contact with the interior of the casing.

8. In a shock absorber for truck springs of railway cars, the combination with top and bottom spring follower plates adapted to receive said truck springs therebetween; of a casing fixed to one of said spring follower plates; a post fixed to the other of said spring follower plates; a plurality of friction shoes engaging the interior of said casing; and a rubber element under lateral compression between said shoes and post, said rubber element having its outer and inner sides sealed respectively to said shoes and post.

9. In a shock absorber, the combination with top and bottom spring followers; of means yieldingly opposing relative movement of said spring followers toward each other; a friction casing fixed to one of said spring followers; a post fixed to the other of said spring followers and extending into said casing; a series of friction shoes surrounding said post, said shoes being in sliding frictional engagement with the interior of the casing; spring means exteriorly of said casing interposed between said spring followers and yieldingly resisting relative approach thereof; and a circular rubber sleeve surrounding said post, said sleeve being under lateral compression and interposed between said post and shoes, said sleeve being hermetically sealed to both said post and shoes.

10. In a shock absorber, the combination with a friction casing; of a post extending into said casing, said casing and post being movable toward and away from each other lengthwise of the device; means yieldingly opposing relative movement of said post and casing toward each other; friction shoes having sliding frictional engagement with said casing; a rubber element under compression interposed between said shoes and post, said element being fixed to the shoes and post and yieldingly opposing relative movement in lengthwise direction between said post and shoes by stretching of said element lengthwise of the device; and stops on said post engageable with either ends of said shoes to actuate the latter after a predetermined relative movement of said post and shoes.

11. In a shock absorber, the combination with a tubular casing; of a post extending into said casing, said post and casing being relatively movable in lengthwise direction; a series of friction shoes surrounding said post and in frictional contact with the interior of the casing; and a sectional rubber tube around said post, interposed between the same and the shoes, said sectional rubber tube being under lateral compression and sealed at its inner and outer sides to said post and shoes respectively.

ROLAND J. OLANDER.